(12) United States Patent
Hiemstra et al.

(10) Patent No.: US 10,150,387 B2
(45) Date of Patent: Dec. 11, 2018

(54) VEHICLE SEAT RECLINER ASSEMBLY

(71) Applicant: Johnson Controls Technology Company, Plymouth, MI (US)

(72) Inventors: Bruce Hiemstra, Ann Arbor, MI (US); Scott Profozich, Canton, MI (US)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 171 days.

(21) Appl. No.: 15/124,201

(22) PCT Filed: Mar. 4, 2015

(86) PCT No.: PCT/US2015/018703
§ 371 (c)(1),
(2) Date: Sep. 7, 2016

(87) PCT Pub. No.: WO2015/134587
PCT Pub. Date: Sep. 11, 2015

(65) Prior Publication Data
US 2017/0021743 A1      Jan. 26, 2017

Related U.S. Application Data

(60) Provisional application No. 61/949,444, filed on Mar. 7, 2014.

(51) Int. Cl.
*B60N 2/00* (2006.01)
*B60N 2/22* (2006.01)
(Continued)

(52) U.S. Cl.
CPC ............... *B60N 2/22* (2013.01); *B60N 2/235* (2013.01); *B60N 2/682* (2013.01); *B60N 2205/50* (2013.01)

(58) Field of Classification Search
CPC .......... B60N 2/235; B60N 2/682; B60N 2/22; B60N 2205/50; B60N 2/2362; B60N 2/2356; B60N 2/236
(Continued)

(56) References Cited

U.S. PATENT DOCUMENTS

| 5,871,414 A | 2/1999 | Voss et al. |
| 6,637,821 B2 * | 10/2003 | Lee ...................... B60N 2/2252 297/362 |

(Continued)

FOREIGN PATENT DOCUMENTS

| DE | 10 2008 045349 A1 | 3/2010 |
| WO | 2011/160771 A1 | 12/2011 |

*Primary Examiner* — Chi Q Nguyen
(74) *Attorney, Agent, or Firm* — McGlew and Tuttle, P.C.

(57) ABSTRACT

A mechanism for reclining the seat back of a seat. The seat back is pivotally connected to the seat base is by a locking fixture that selectively locks and releases the seat back from the seat base. A return spring biases the seat back in the upright position and a handle in the area of the pivot point allows the operator/occupant to selectively control whether the seat back is locked or released. The return spring is mounted on an outside of the seat back and seat base, and is in the form of a coil spring. A stop element connects the handle to the locking fixture. The stop element is arranged radially inward of the coil spring. The stop element preferably has a large diameter portion with lugs interacting with the locking fixture, and has a smaller diameter portion arranged radially inward of the coil spring.

14 Claims, 15 Drawing Sheets

(51) Int. Cl.
*B60N 2/235* (2006.01)
*B60N 2/68* (2006.01)

(58) Field of Classification Search
USPC .................. 297/354.12, 367 P, 367 R, 366
See application file for complete search history.

(56) References Cited

U.S. PATENT DOCUMENTS

| | | | |
|---|---|---|---|
| 6,910,738 B2 * | 6/2005 | Bonk ..................... | B60N 2/236 |
| | | | 16/325 |
| 6,991,295 B2 | 1/2006 | Peters | |
| 7,086,697 B2 | 8/2006 | Tame | |
| 7,100,987 B2 * | 9/2006 | Volker .................. | B60N 2/236 |
| | | | 297/367 R |
| 7,114,778 B2 * | 10/2006 | Schuler et al. ...... | B60N 2/1615 |
| | | | 297/367 R |
| 7,198,330 B2 | 4/2007 | Wahlen et al. | |
| 8,616,648 B2 | 12/2013 | Holzhueter et al. | |
| 9,902,297 B2 * | 2/2018 | Robinson ............... | B60N 2/236 |
| 2008/0148517 A1 | 6/2008 | Rosato et al. | |
| 2011/0025114 A1 * | 2/2011 | Berndtson ............ | B60N 2/236 |
| | | | 297/367 P |
| 2011/0101755 A1 * | 5/2011 | Assmann ................ | B60N 2/22 |
| | | | 297/366 |
| 2011/0181088 A1 | 7/2011 | Zhang et al. | |
| 2014/0110984 A1 * | 4/2014 | Assmann ................ | B60N 2/20 |
| | | | 297/354.1 |
| 2015/0360589 A1 * | 12/2015 | Robinson ............... | B60N 2/236 |
| | | | 297/367 P |

\* cited by examiner

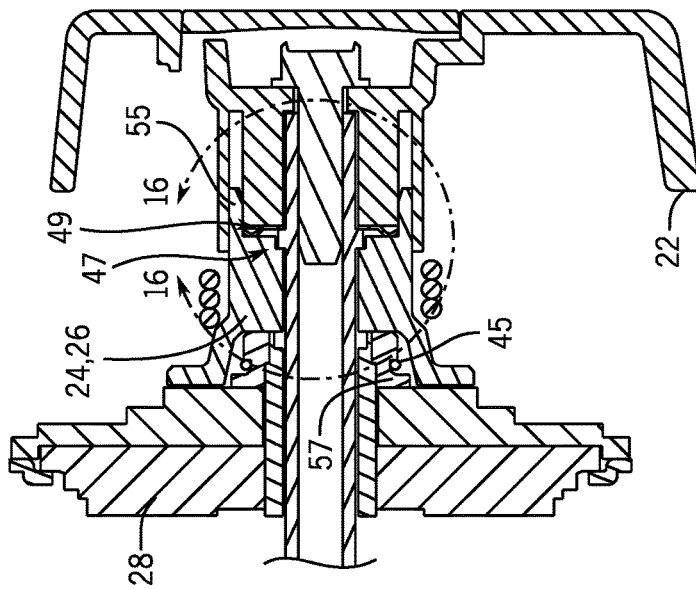
FIG. 14
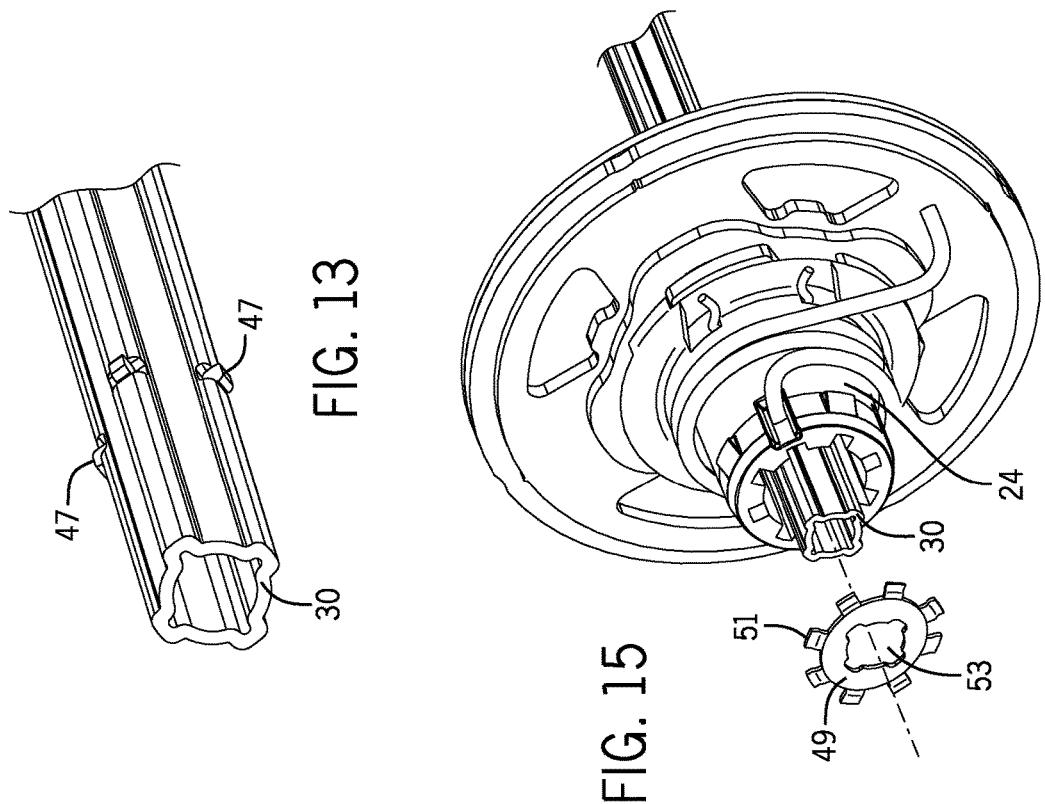
FIG. 13
FIG. 15

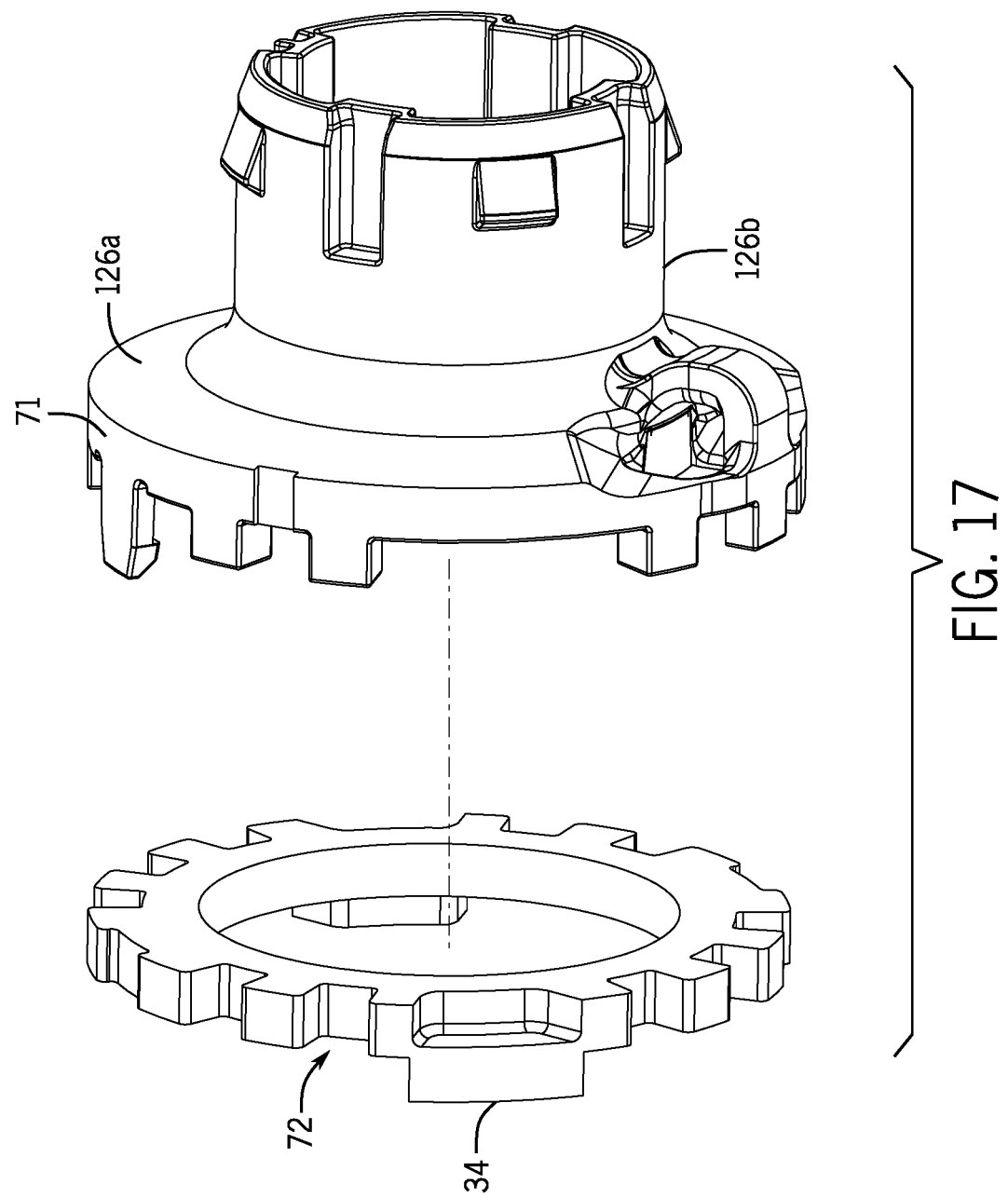

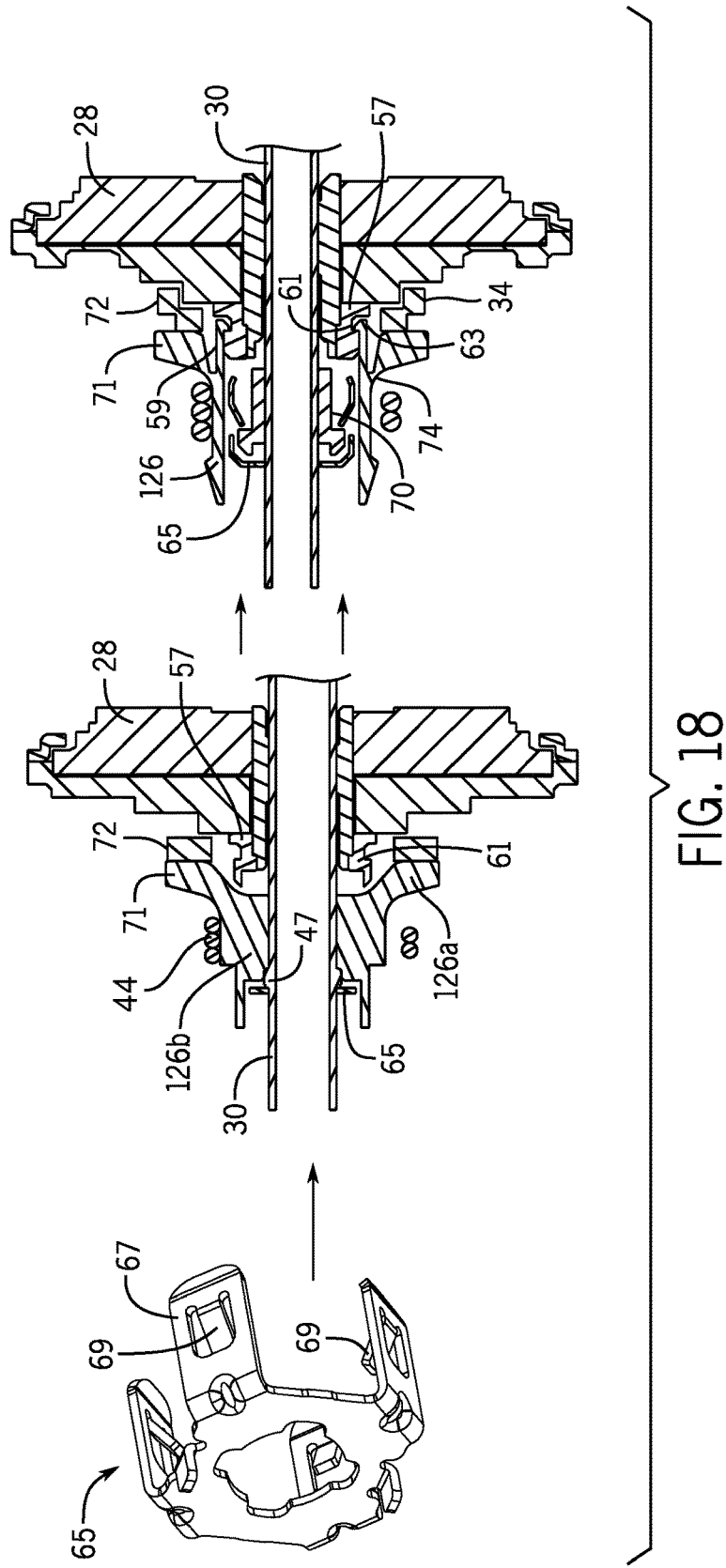

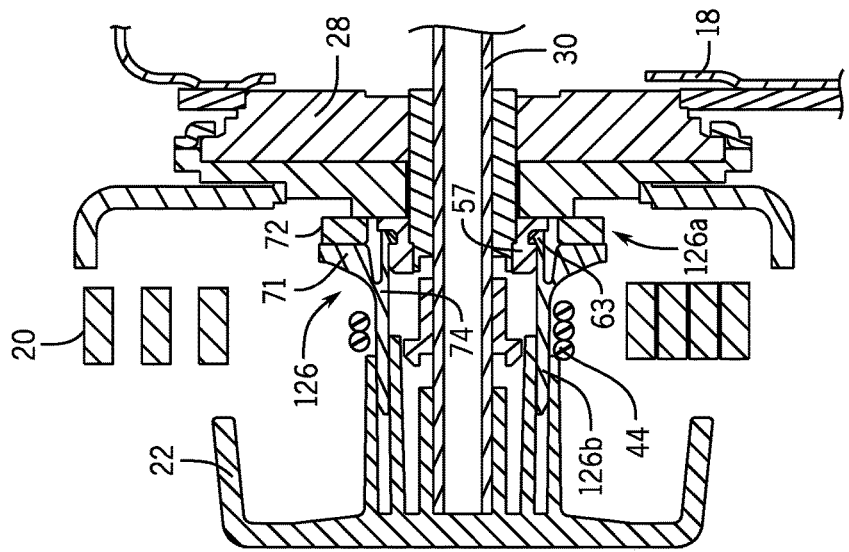
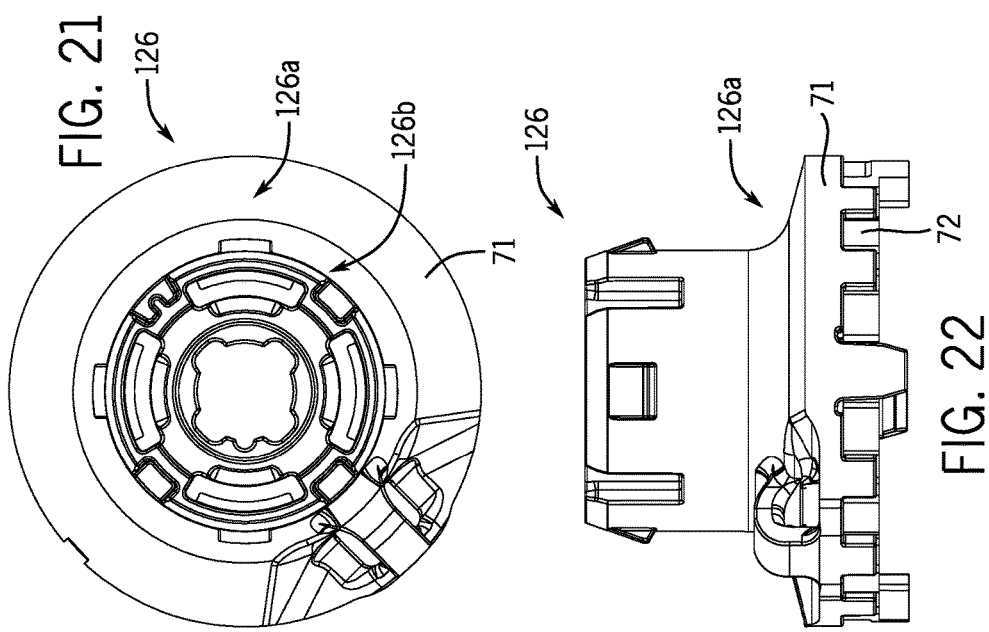
FIG. 21
FIG. 22
FIG. 23

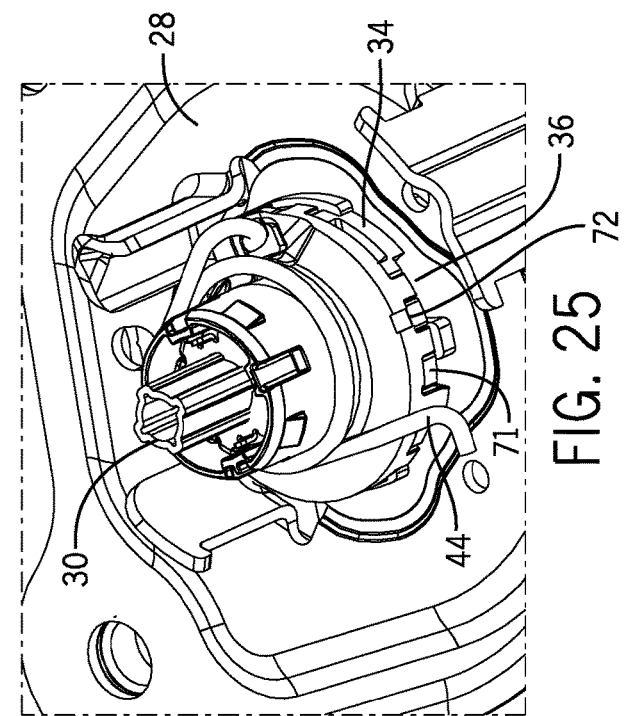
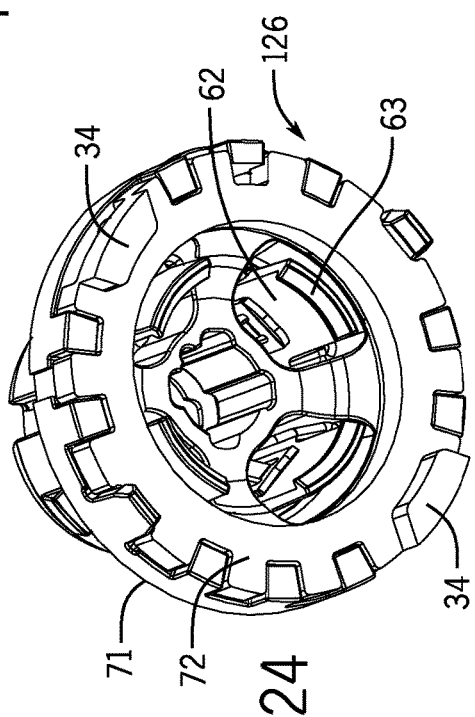
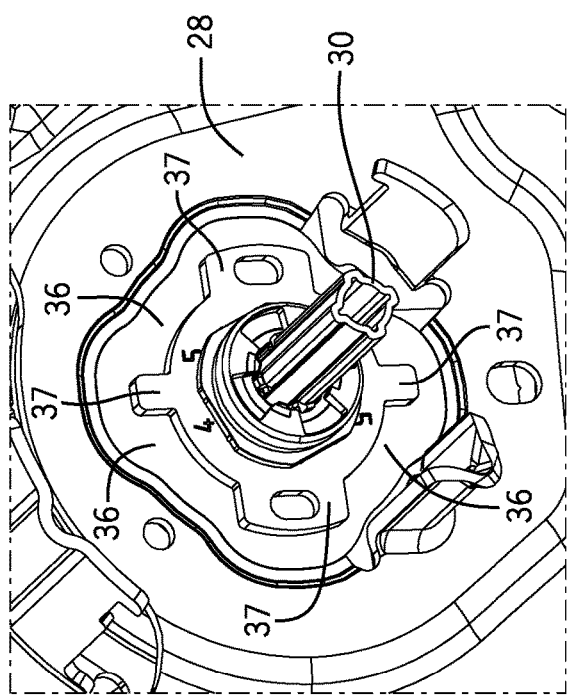
FIG. 25
FIG. 24
FIG. 26

VEHICLE SEAT RECLINER ASSEMBLY

CROSS REFERENCE TO RELATED APPLICATIONS

This application is a United States National Phase Application of International Application PCT/US2015/018703 filed Mar. 4, 2015 and claims the benefit of priority under 35 U.S.C. § 119 and 120 of U.S. Application 61/949,444 filed Mar. 7, 2014, the entire contents of which are incorporated herein by reference.

FIELD OF THE INVENTION

The present invention relates to an assembly that allows a seat back to pivot with respect to a seat base, and in particular to the elements that selectively angularly lock, release and bias the seat back with respect to the seat base.

BACKGROUND OF THE INVENTION

In a vehicle, a person's sitting position is very important, especially for the driver of the vehicle. People who travel in vehicles are confined to a small space, and are often in this space for extended periods of time. In order to provide the occupant with a better experience, it is desired to make the seat comfortable. One way of doing this, is to have the seat back lock into a plurality of angular positions with respect to the seat base, so that the occupant of the seat can adjust the seat back into a position that is most comfortable for the occupant.

Making the seat back of a vehicle seat selectively lockable into a plurality of angular positions involves meeting several safety requirements, especially with regard to behavior of the seat back during a vehicle crash. This is often accomplished by making the elements of the seat strong, which often causes the elements to be large and heavy. Alternately, it is desirable to make the assembly that reclines the vehicle seat small and lightweight so that there is more room in the vehicle for the occupant, and that the vehicle performs better, especially with regard to fuel consumption. It is also desirable to make the recliner assembly reliable so that the elements are not damaged by an occupant applying excessive force. Increasing reliability, also tends to make the elements of the assembly large and heavy, which is counter to providing more room for the occupant and increasing performance of the vehicle.

SUMMARY OF THE INVENTION

The present invention is a seat for a vehicle, where the seat has a seat base with base side panels, and a seat back with seat back side panels. The seat back side panels each have one end arranged inward of the base side panels. A locking fixture pivotally connects the seat back to the seat base. The locking fixture selectively locks the seat back to the seat base in a plurality of angular positions. A return spring is connected to the seat base and the seat back, and biases the seat back in an angular direction with respect to the seat base. In particular, the return spring biases the seat back into the upright position, and counteracts the weight of the seat back. The return spring preferably is a coil spring and is arranged on an outside of at least one of the base side panels. Outside being with respect to a center of the seat.

A handle is arranged outward of the return spring and is connected to said locking fixture. The handle forms an operator interface for an operator to operate the locking fixture, and selectively lock and unlock the seat back to the seat base in the plurality of angular positions. The handle can be connected to the locking fixture by a cross shaft that extends through the return spring. When the operator rotates the handle, the handle causes the cross shaft to rotate, which rotates a portion of the locking fixture, allowing the operator/seat occupant to selectively raise and lower the seat back.

One of the problems of locking fixtures, is that they can be damaged by the operator applying excessive force to the locking fixture, above and beyond what is needed to properly operate the locking fixture. The present invention uses a stop element to prevent an operator from applying too much force to the locking fixture. Excess force on the locking fixture may prevent complete locking of the seat back with regard to the seat base, and the occupant may not be aware of this reduced performance condition. The stop element can limit rotation of the handle in either rotational direction, i.e. the rotational direction to unlock the seat back, or the rotational direction to lock the seat back.

The stop element is arranged, preferably on the outside, of the at least one of the base side panels. The stop element is connected to the handle in a rotationally fixed manner, preferably through the cross shaft, and engages with another portion of the locking fixture to limit rotation of the handle relative to the locking fixture. The stop element is arranged radially inside the return spring.

Some of the goals of a vehicle are to transport the occupants safely, efficiently, reliably, inexpensively and comfortably. By making a seat assembly with small components, there is more room for the occupant, and for structure that comfortably supports the occupant. Also, small components can reduce the overall size and weight of the vehicle which increases its efficiency. By making a seat assembly with light components, fuel efficiency is also increased. Increasing the strength of the seat components, increases safety and reliability. However, increasing strength usually requires increasing the size and weight of the components, which counteracts the efficiency and comfort. The present invention is a combination of seat components which reduces the size and weight of the seat components for efficiency and comfort, while still maintaining strength for safety and reliability.

The locking fixture of the present invention is made smaller, and more lightweight, but maintains sufficient strength in order to avoid the problem of damage occurring from excess force. This also increases occupant safety by reducing damage potential.

The present invention further accomplishes a reduction in weight and size, while maintaining or increasing reliability, by having the return spring arranged externally, or on the outside, of the side panels of the seat base and seat back. The stop element has a larger diameter portion which interfaces with portion of the locking fixture, and has a smaller diameter which is arranged radially inside the return coil spring. The larger diameter has lugs which contact the locking fixture. The larger diameter allows the rotational force or torque to be spread over a larger area, and therefore increase the strength of the stop element. The smaller diameter portion of the stop element reduces the size and weight of the stop element, and allows the stop element to fit inside the return coil spring. This smaller diameter portion thus also allows the return coil spring to be arranged on the outside of the side panels in conjunction and axially colocated with the stop element. This further reduces the space of the assembly that allows for raising and reclining the seat back.

The stop element can be formed in two separate pieces, and of different materials, to reduce weight and maintain or increase strength. To keep costs low the stop element can be formed in one piece, especially when formed of one material, but the strength may be less, or the weight more.

To increase the strength further, while keeping the weight low, the larger diameter portion can be formed of from high strength materials such as metal, while the smaller diameter portion can be formed of a less dense material such as plastic. To further increase strength, while lowering weight, only a section of the larger diameter portion is formed of high-strength material, while the rest of the larger diameter portion is formed of the less dense material such as plastic. In this embodiment, the larger diameter portion has lugs which interact with the locking fixture, and these lugs are formed of the high strength material. Another side of the high-strength material has an interface to the other section of the larger diameter portion which spreads out the load, and allows the use of a lower strength, less dense material. The strength of the stop element is significant, especially with regard to reliability, since occupants can often apply much more force than is necessary to the handle to raise and lower the seat back. Also, occupants often inadvertently apply excess force to the handle by stepping or standing on the seat.

Locking fixtures which selectively angularly lock and release a seat back with respect to a seat base are known for example from U.S. patent application Ser. No. 13/045,883, U.S. Pat. No. 6,991,295, and U.S. Pat. No. 7,198,330 which are incorporated by reference in their entirety.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 13 is a view of the cross shaft;
FIG. 14 is a cross sectional view of the locking fixture, the stop element and the handle;
FIG. 15 is a perspective view of the pushnut being mounted on the cross shaft;
FIG. 17 is a view of an embodiment where the larger diameter portion and the smaller diameter portion of the stop element is formed together, and the larger diameter portion has a separate portion made of a different material;
FIG. 18 is a view of the cross shaft being connected to the stop element by a spring clip;
FIG. 21 is an end view of the embodiment of FIG. 18;
FIG. 22 is a side view of the embodiment of FIG. 18;
FIG. 23 is a cross sectional view of the connection between a seat back and a seat base using the embodiment of FIG. 18;
FIG. 24 is a perspective end view of the embodiment of FIG. 18;
FIG. 25 is a perspective view of the embodiment of FIG. 18 mounted on the cross shaft and a locking fixture;
and
FIG. 26 is a perspective view of the locking fixture and the cross shaft, with particular pointing out the running areas.

DESCRIPTION OF THE PREFERRED EMBODIMENTS

Figure 1:
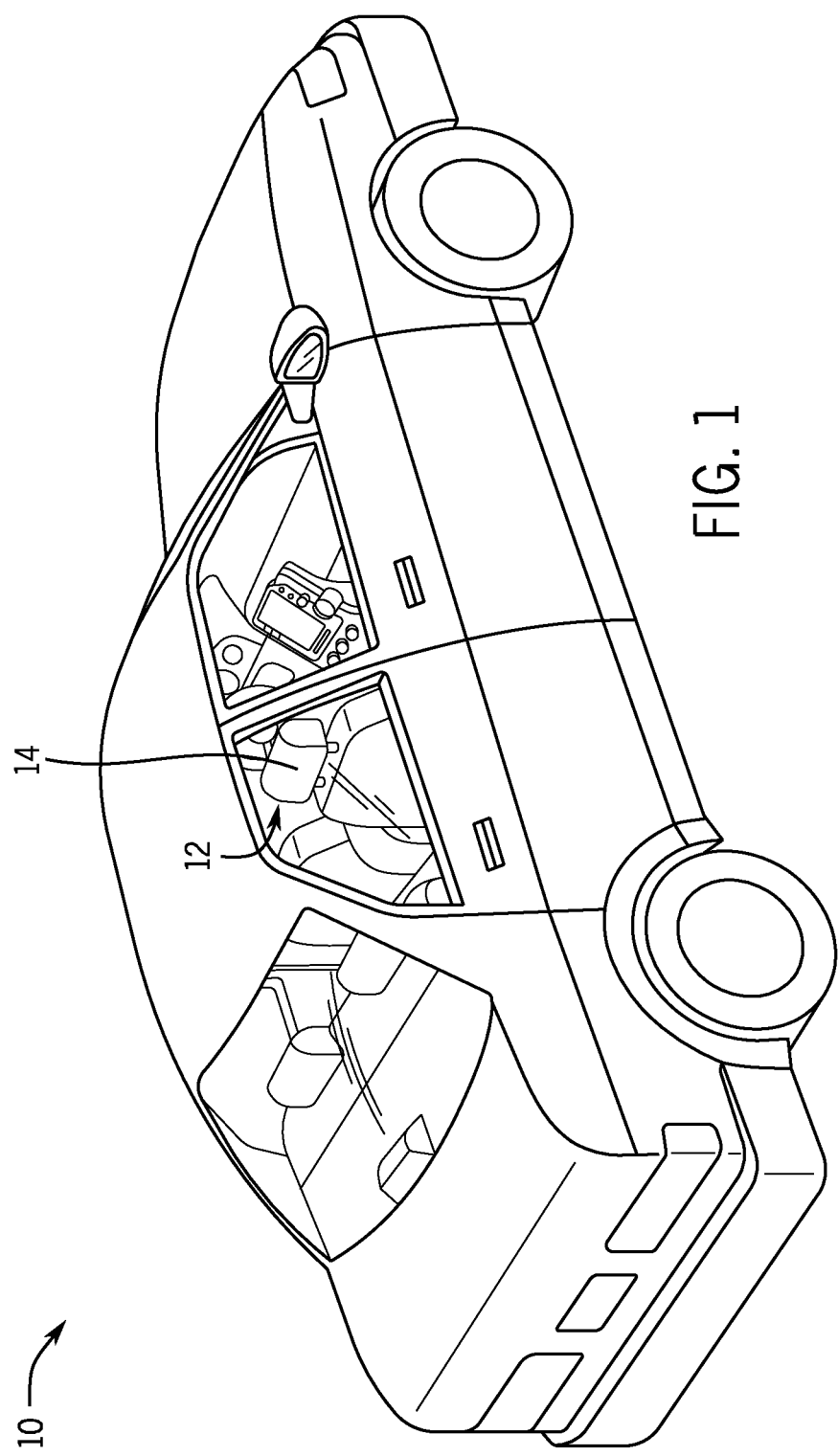
FIG. 1 is a view of a vehicle with a vehicle seat.

Referring to the drawings in particular, FIG. 1 shows a motor vehicle 10, also known as an automobile, with a seat 12. As one can see, space inside the vehicle 10 is limited. FIG. 1 shows the seat back 14 in the upright position. To increase the comfort of the seat occupant, is often desirable to adjust the angular position of the seat back 14 to a position that is more horizontal by leaning the seat back 14 towards the rear of the vehicle 10.

Figure 2:
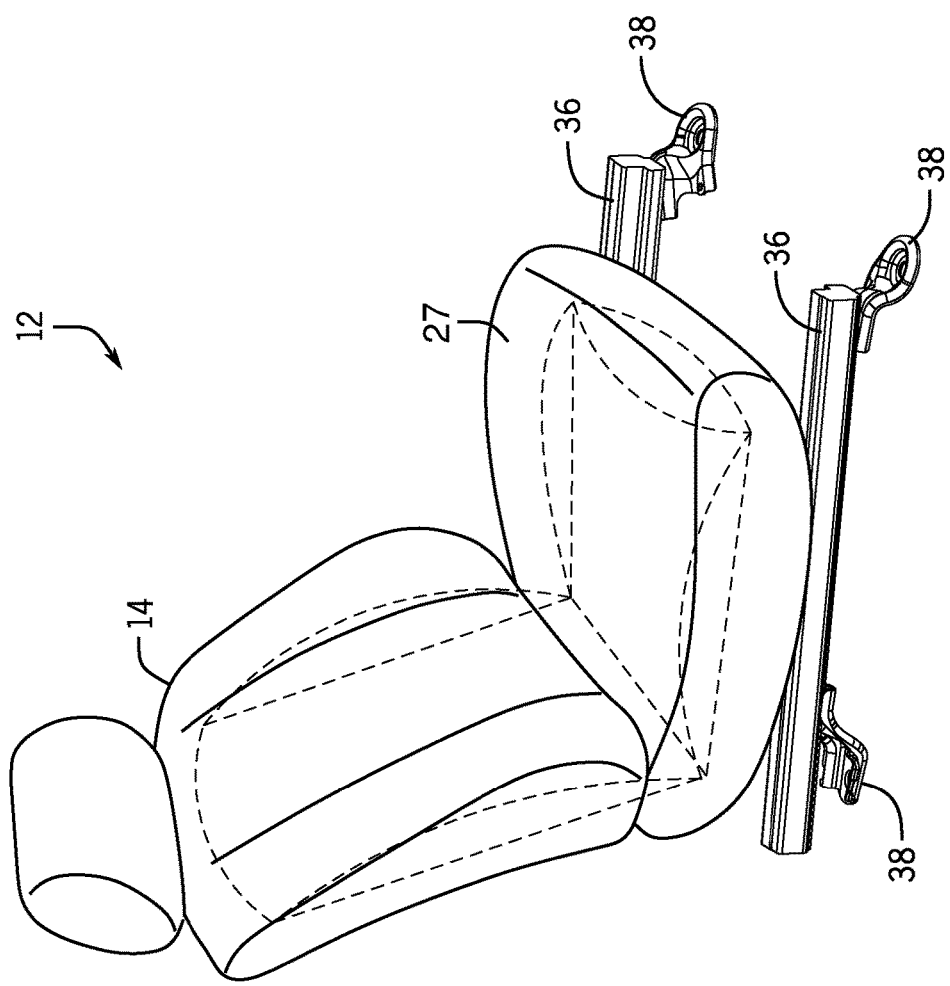
FIG. 2 is a view of a vehicle seat.
Figure 3:
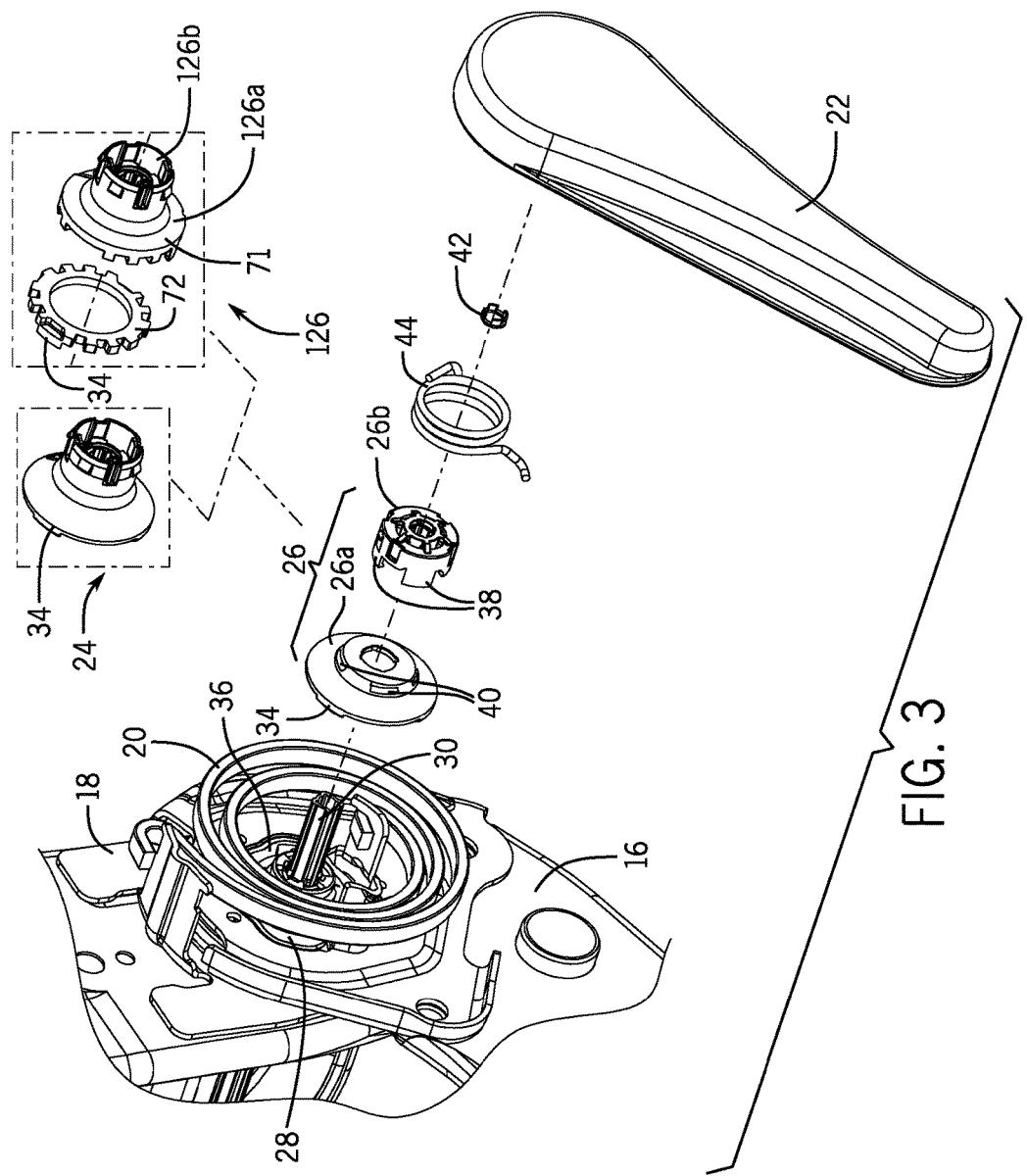
FIG. 3 is a view of an assembly pivotally connecting the seat back to the seat base.

Referring to FIG. 2, the seat 12 has a seat back 14 and a seat base 27. The seat 12 can be connected to the vehicle 10 by means of tracks 36 and brackets 38. The seat base 27 has two base side panels 16 arranged on diametrically opposite sides of the seat base 27. One of the base side panels 16 is shown in FIG. 3. The seat back 14 has two seat back side panels 18 arranged on diametrically opposite sides of the seat back 14. One of the seat back side panels 18 is also shown in FIG. 3. In the preferred embodiment, an end of the seat back side panels 18 is arranged inwardly of the base side panels 16.

A locking fixture 28 pivotally connects the seat back 14 to the seat base 27. The locking fixture 28 selectively locks and releases the seat back 14 into and out of a plurality of angular positions with respect to the seat base 27. Examples of the locking fixture 28 are described in the documents previously incorporated by reference. A return spring 20 biases the seat back 14 in an angular direction with respect to the seat base 27. In a preferred embodiment, the return spring 20 biases the seat back 14 into an upright position from a reclining position. This helps to counteract the weight of the seat back 14 which would bias the seat back into the reclined position.

A handle 22 is provided on the outside of the seat 12 to form an operator interface for the operator or occupant of the seat to selectively control the position of the seat back 14 with respect to the seat base 27. The handle 22 rotates about, and preferably with, a cross shaft 30. The cross shaft 30 extends into the locking fixture 28. Rotation of the handle 22 causes the cross shaft 30 to rotate, which then causes a portion of the locking fixture 28 to rotate. Rotation of this portion of the locking fixture 28 in one direction pivotally unlocks the seat back 14 with respect to the seat base 27.

Rotation of this portion of the locking fixture 28 in the other direction pivotally locks the seat back 14 with respect to the seat base 27.

Rotation of the handle 22 also causes a stop element to rotate. Several different embodiments of the stop elements are shown in the drawings by reference numbers 24, 26, 32 and 126. The basic stop element is element 24 which will be primarily used for the initial description. The features described for stop element 24 are also applicable to stop element 26, 32 and 126. The stop element 24 rotates with the handle 22 preferably by a rotationally fixed connection to cross shaft 30. The stop element 24 also engages with a portion of the locking fixture 28 to limit rotation of the cross shaft 30 and handle 22 with respect to the locking fixture 28. In particular, this is done by the stop element 24 having lugs 34 which engage in running areas 36 of the locking fixture 28. The running areas 36 having a greater circumferential extent than the lugs 34, so that the lugs are rotationally movable in the running areas 36 within a range, but not beyond that range.

Figure 10:
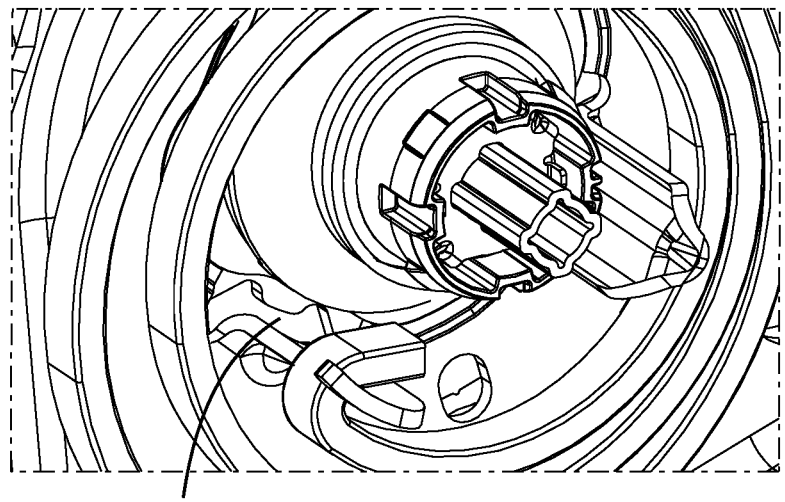
FIG. 10 is a view of the stop element interacting with the locking fixture.
Figure 11:
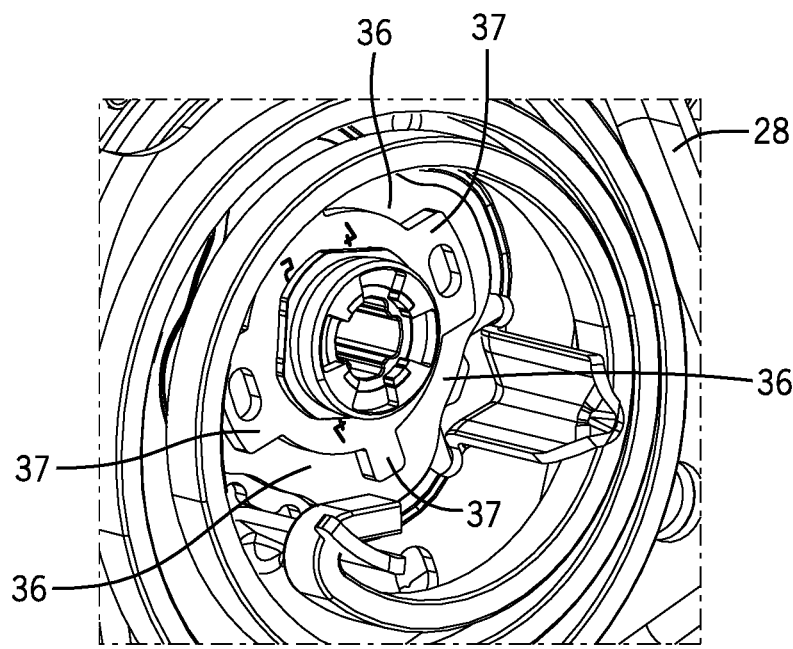
FIG. 11 is another view of the stop element interacting with the locking fixture.

FIGS. 10 and 11 provide enlarged examples of a running area 36. In particular, when the lugs 34 hit the stops 37 at the end of the running areas 36, rotation of the stop element 24 is stopped which then stops rotation of the cross shaft 30 and handle 22 with respect to the locking fixture 28.

Figure 4:
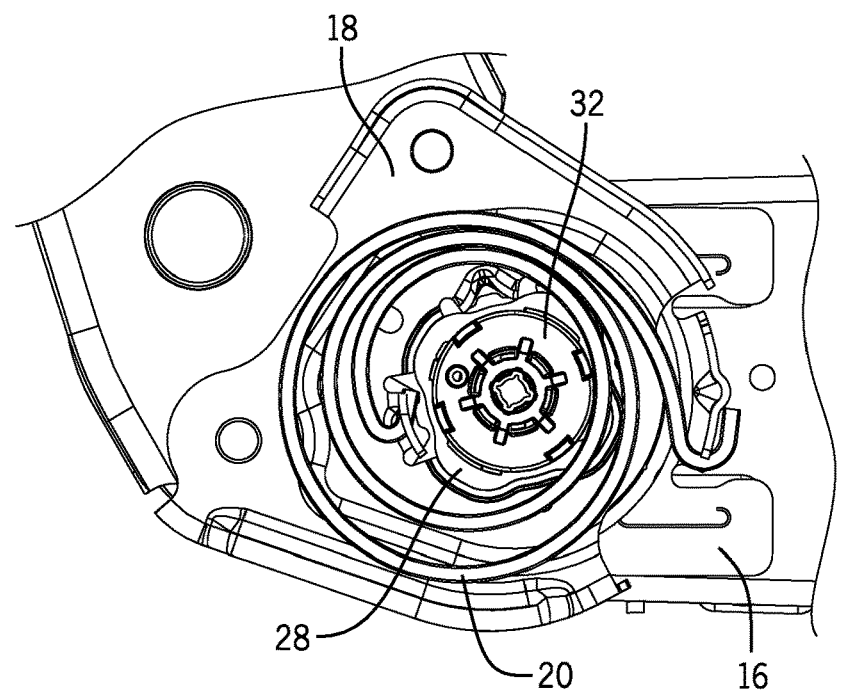
FIG. 4 is a view of a stop element in contact with a return spring.
Figure 5:
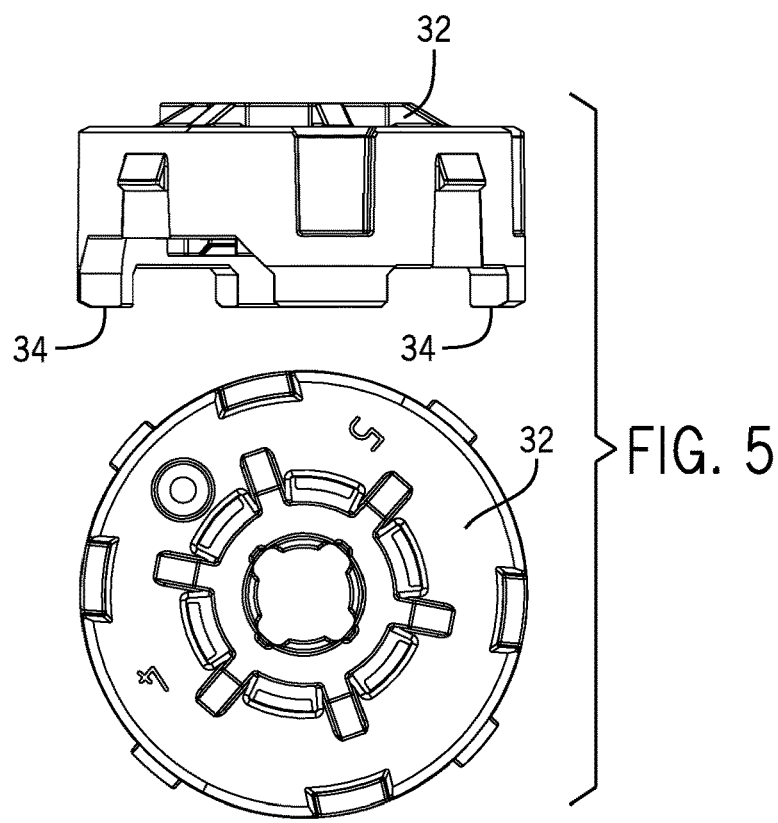
FIG. 5 is a view of a first embodiment of a stop element.
Figure 6:
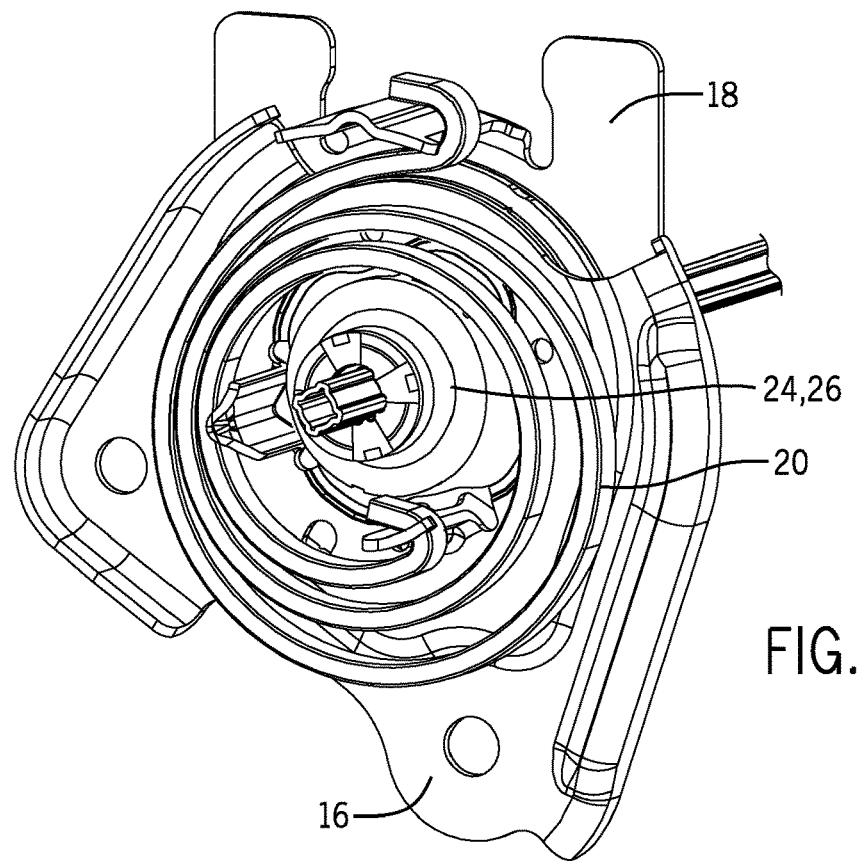
FIG. 6 is a view of second embodiment of a stop element arranged with a return spring.
Figure 7:
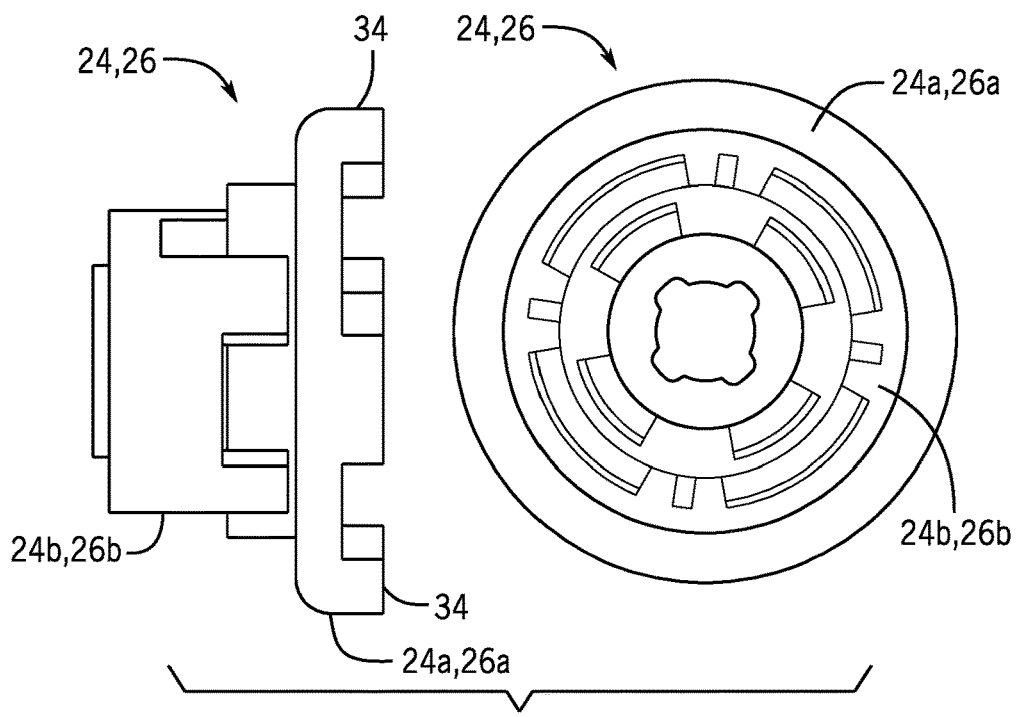
FIG. 7 is a view of a second embodiment of a stop element.
Figure 8:
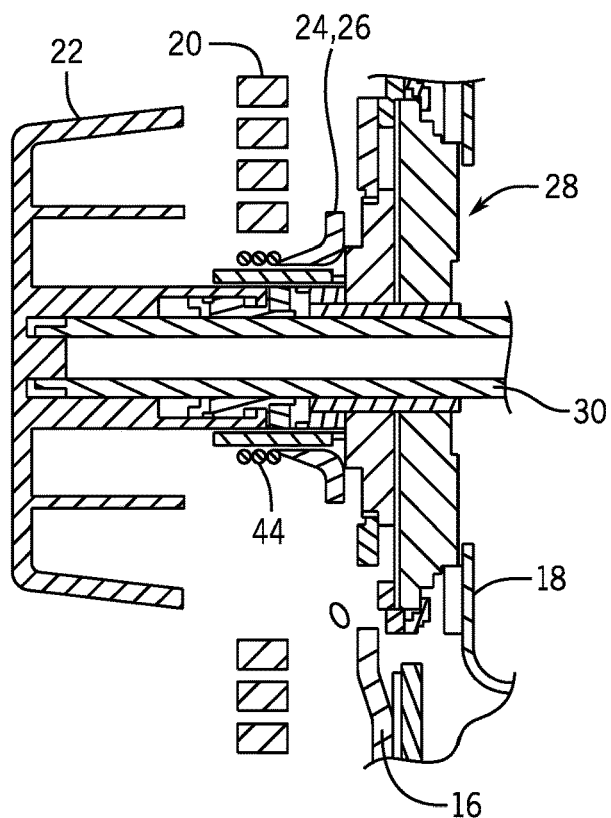
FIG. 8 is a cross sectional view of the connection between a seat back and a seat base.
Figure 9:
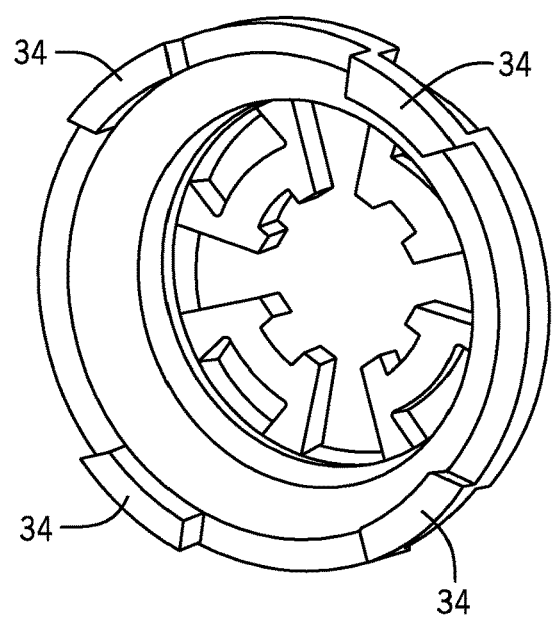
FIG. 9 is a view of the stop element.

As shown in FIG. 4, the stop element 24 has a portion arranged radially inside the coil of the return spring 20 to save space, and to further allow the return spring to be mounted on the outward side of the seat base 27. The return spring 20, stop element 24 and handle 22 are thus arranged on the outward side of the base side panel 16. Depending on the size of the return spring 20, and the stop element 24, there can be contact between the return spring 20 and the stop element 32 as shown in FIG. 4. This contact can limit the effectiveness of the return spring 20. If a larger return spring 20 is desired, such as to increase the biasing force, or to use a less expensive, but larger, material for the return spring 20 or stop element 24, the stop element 24 can be made with a larger diameter portion 24a/26a/126a, and a smaller diameter portion 24b/26b/126b. The larger diameter portion 24a, etc, has the lugs 34 which engage with the running areas 36 of the locking fixture 28. The smaller diameter portion 24b fits inside the coil of the return spring 20 and gives the return coil spring 20 more room to expand and contract as the seat back 14 rotates between its extreme end positions. This allows the return spring 20 to provide more biasing force, and/or to be made of a less expensive material.

The larger diameter portion 24a allows the lugs 34 to withstand greater rotational force or torque before breaking or shearing off, and also to fit with existing locking fixtures 28. This withstanding of great force is important because often the operator/occupant of the seat will apply more force to the handle 22 than is necessary to operate the locking fixture 28. Fitting with existing locking fixtures allows that the running areas of the locking fixture do not need to be redesigned to allow a stop element 24 that fits inside a return spring 20. The extra force applied by the operator/occupant can be done accidentally such as by the operator/occupant standing on the seat base 27, or by the fact that when the operator/occupant is sitting in the seat 12, it is very easy for the operator/occupant to apply a great deal of force to the handle 22 just because the handle 22 is positioned in a location convenient to applying excessive force. This especially occurs if the seat back 14 can become temporarily stuck or jammed, the operator may apply excess force thinking that this will free the seat back 14. The combination of the large diameter portion 24a and the smaller diameter portion 24b allow the stop element 24 resist breaking from excessive force, allows the use of existing locking fixtures 28, and allows more room for the return spring 20 to operate. The whole arrangement of the return spring 20 and the stop element 24 with two different diameters can then be arranged on the outside of the base side panel 16 which allows more room inside of the side panels 16/18 for structure which increases the comfort of the occupant.

The stop element 24 can be made in one piece, and of one material, to reduce costs. The material of the one piece stop element 24 can be chosen to be of any particularly strong material to increase the reliability and resistance to breakage during overload or over force conditions. This usually involves choosing a material that has a high density, or a high cost. Alternatively, the material of one piece stop element can be chosen to be lightweight or inexpensive in order to increase performance of the vehicle, or reduce costs. This usually involves a material that gives a lesser reliability and lesser resistance to breakage during overload or over force conditions. In the one-piece design of the stop element 24, the material can preferably be either be metal or plastic.

Figure 12:
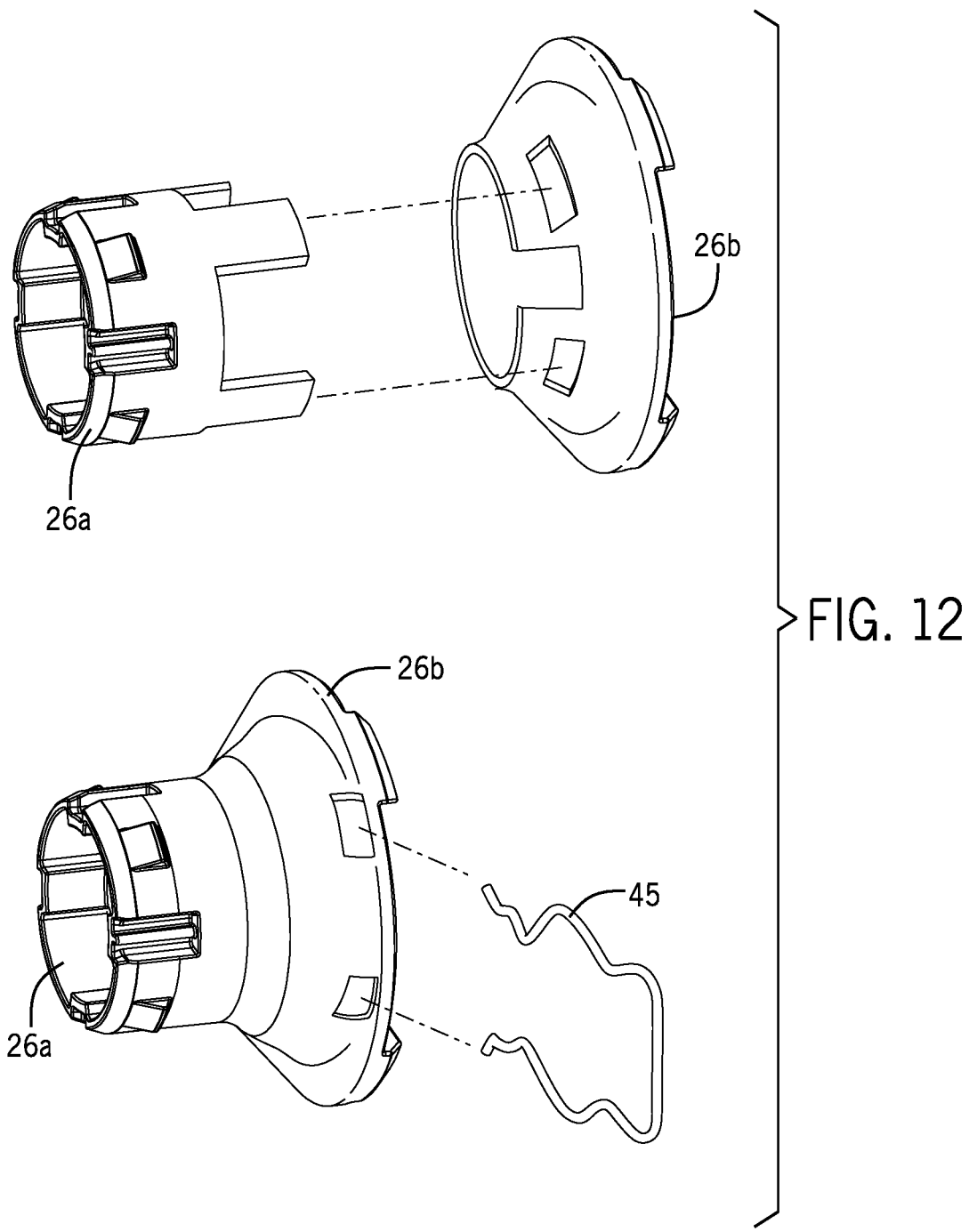
FIG. 12 is a view of third embodiment of a stop element arranged with a clip.
Figure 16:
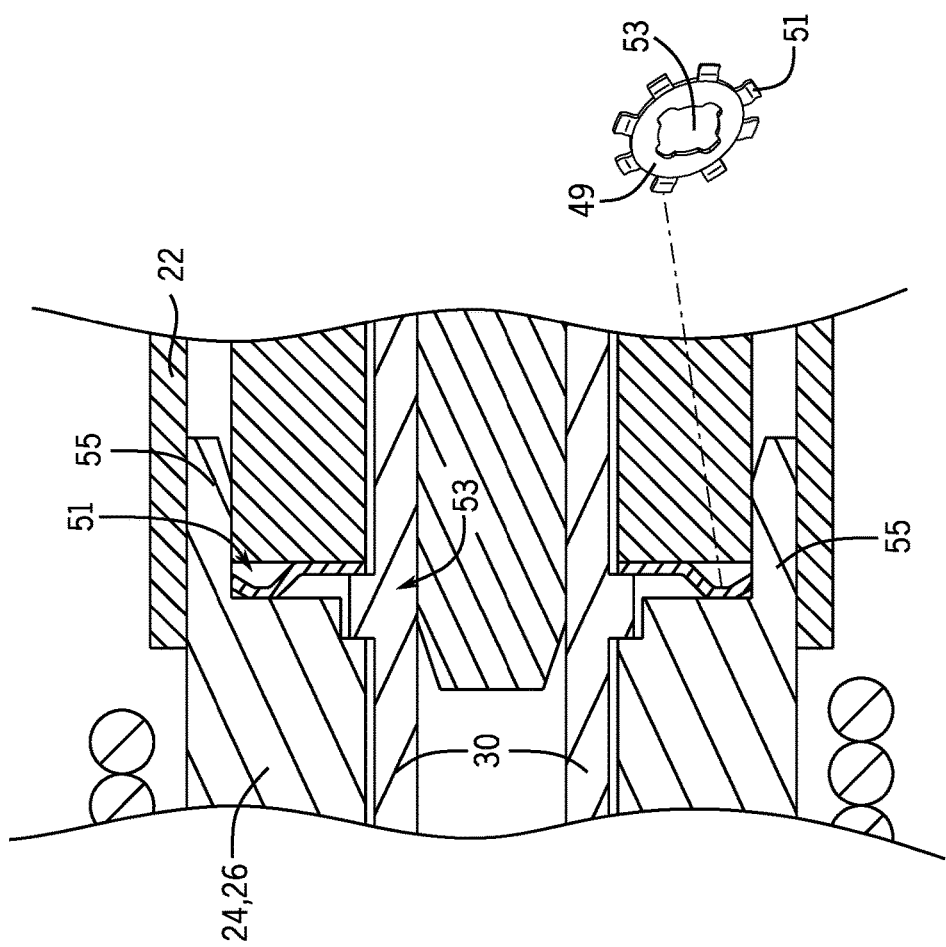
FIG. 16 is an enlarged view of the connection between the stop element and the cross tube of FIG. 11.

In one embodiment, the stop element 26 can be made as a two-part structure where the larger diameter portion 26a is constructed of a material that is stronger than the material of the smaller diameter portion 26b. The material of the larger diameter portion 26a has greater strength (tensile, shear, compressive) and stiffness (greater modulus of elasticity), then the smaller diameter portion 26b. The material of the smaller diameter portion 26b can be less dense, or less expensive, than the material of the larger diameter portion 26a. Preferably the larger diameter portion 26a is formed of metal, such as steel or die cast zinc, and the smaller diameter portion 26b is formed of plastic, or glass filled plastic. In the two-part stop element 26, the larger diameter portion 26a and the smaller diameter portion 26b can connect by prongs 38 fitting into openings 40. In the alternative, the larger diameter 26a and the smaller diameter 26b can be connected by fusing the two parts together, such as by injection molding one part onto the other part, or any other connection which provides a suitable joining. In still a further alternative, the larger diameter 26a can be connected to the smaller diameter 26b by another member, such as clip 45 shown in FIG. 12. This more securely connects the two portions 26a and 26b, which is especially beneficial for the mechanism to withstand both overload conditions and side impact conditions/crashes of the vehicle.

In another embodiment as especially shown in FIGS. 3 and 17, stop element 126 can also be formed with the larger diameter portion 126a being formed of two different parts 71 and 72. One of the parts 71 of the larger diameter portion 126a is formed of the same material as the smaller diameter portion 126b, and another part 72 of the larger diameter portion 126b is formed of a material with a greater strength, such as metal, and preferably steel, and shaped by stamping or formed as a powder metal part, as shown in FIG. 3, 17-21. This part 72 includes the lug 34, and also an interface to the other part 71. The interface between the parts 72 and 71 is preferably arranged so that the rotational force, or torque, is spread out so that the material of the part 71 can handle the force without being damaged. The part 72 usually needs to be stronger than the part 71, because existing locking fixtures 28 have running areas 36 that limit how much the rotational force, or torque, can be spread out.

The stop element 24 can also be held in contact with the locking fixture 28 by the clip 45 which can connect the stop element 24 to the locking fixture 28, and preferably to a driver ring 57. A push nut 42, shown in FIG. 3 which attaches to the cross shaft 30 can be arranged at the other end of the stop element 24 to position the stop element 24. A handle spring 44 biases the handle 22 in the direction where the locking fixture 28 locks the seat back 14 in a fixed angular position with respect to the seat base 27.

A different internal push nut 49 can also be mounted on the cross shaft 30 to coordinate with radial projections 47 which extend radially outward from the cross shaft 30, as shown in FIGS. 13-15. The stop element 24 is arranged around the cross shaft 30 between the locking fixture 28 and the radial projections 47. The radial projections 47 block an axial movement of the cross shaft 30 relative to the stop element 24, and of course vice versa. The internal push nut 49 is also arranged around the cross shaft 30, but on the diametrically opposite side of the radial projections 47 from the stop element 24, as shown in FIG. 14. The internal push nut 49 has fingers 51 which are rigidly connected to an extension 55 of the stop element 24. The internal push nut 49 defines an opening 53 which is larger than a diameter of the cross shaft 30, but smaller than a diameter of the radial projections 47, so that the radial projections 47 block an axial movement of the cross shaft 30 with respect to the stop element 24, and the internal push nut 49. In particular, the internal push nut 49 is shaped to slide along a portion of the cross shaft 30, and then to have the fingers engage with and bite into the extension 55 of the stop element 24. In this way, lateral movement and the position of the cross shaft is controlled by the radial projections 47 of the cross tube 30. This eliminates a push nut resetting process and guarantees desired handle 22 lateral positioning.

Figure 20:
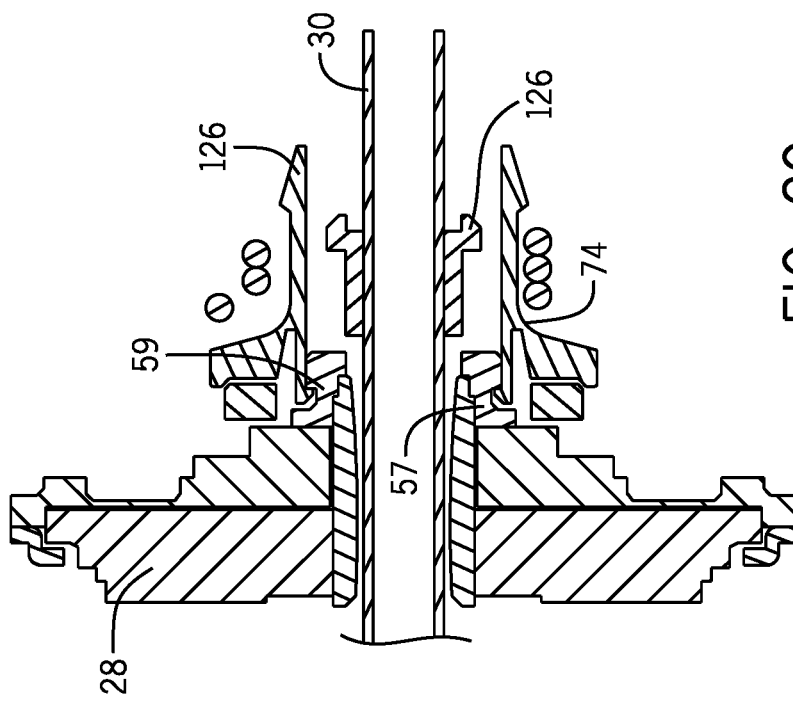
FIG. 20 is a cross sectional view of the radial projections being held between the locking fixture and the stop element, similar to FIG. 19, but at different circumferential angle.
Figure 19:
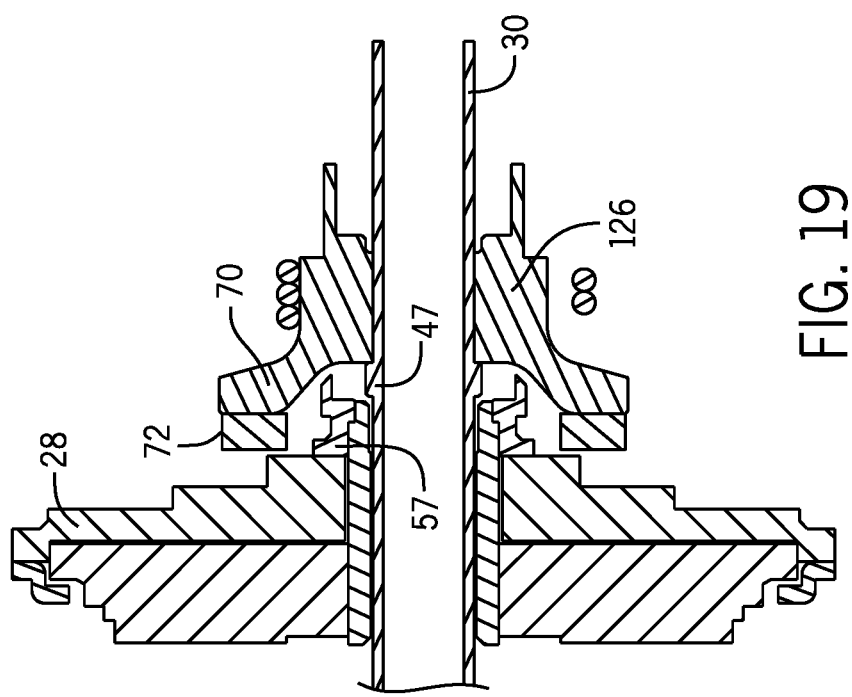
FIG. 19 is a cross sectional view of the radial projections being held between the locking fixture and the stop element.

The stop element, preferably 126, can also be connected to the driver ring 57 of the locking fixture 28 by a snap connection 59 having detents 61 and projections 63, as shown in FIGS. 18-20. In FIG. 18, the right two cross-sectional views are shown at different rotational angles. In particular the rightmost cross-sectional view is shown through a plane that includes the snap connection 59 and the lug 34. While the leftmost cross-sectional view is through plane that does not show the snap connection 59 or the lug 34.

The projections 63 are arranged on the end of tabs 62. In the embodiment of FIGS. 18-20, the stop element 126 is snapped or latched into the driver ring 57, and then the cross shaft 30 is slid into the stop element 24 and the locking fixture 28. A web 74 connects parts 71 with projections 63 as shown in FIG. 18. This is not shown in FIG. 19 because of the particular plane of the cross-section of this Figure. In the embodiment of FIG. 18, instead of a push nut, a snap style spring clip 65 is slid over the cross shaft 30 and the radial projections 47 are trapped between the snap style spring clip 65 and the stop element 126. The snap style spring clip 65 has fingers 67 which pass through the stop element 126, as shown in the cross-sectional views of FIG. 18. The fingers 67 each have at least one prong 69 which latch into recesses 70 of the stop element 126 to connect the snap style spring clip 65 to the stop element 126. This then traps the radial projections 47 between the snap style spring clip 65 and the stop element 126, thus limiting the axial movement of the cross shaft 30 with respect to the stop element 126 and locking fixture 28 in both axial directions.

The radial projections 47 can also be arranged on the cross shaft 30 between the stop element 126 and the locking fixture 28 as shown in FIGS. 19-20. FIGS. 19 and 20 are cross-sectional views through different planes. FIG. 19 is the cross-sectional view through the plane that includes the radial projections 47, and FIG. 20 is the cross-sectional view through the plane including the snap connection 59. The radial projections 47 and the snap connection 59 being in different angular positions about the cross shaft 30.

The locking fixture 28 and the stop element 126 have internal openings that allow the cross shaft 30 to pass, but do not allow the radial projections 47 to pass through. Therefore the radial projections 47 and the locking fixture 28 block the cross shaft 30 from moving in one axial direction, and the radial projections 47 and the stop element 126 block the cross shaft 30 from moving in the opposite axial direction.

In the embodiment of FIG. 23, the stop element 126 is shown connected to the locking fixture 28 by the snap connection 59. The particular connection between the stop element 126 and the cross shaft 30 is not specifically shown. However one can see from the arrangement of the stop element 126, that radial projections could be positioned between the stop element 126 and the locking fixture 28, or between a spring clip, similar to that in FIG. 18, and the stop element 126, or even a push nut 42, 49 could be used.

FIG. 24 shows the stop element 126 in more detail. FIG. 25 shows the stop element 126 mounted on the cross shaft 30 and interfacing with the locking device 28. In particular the lug 34 being arranged in the running areas 36 is shown. FIG. 26 shows in detail the locking element 28 with the running areas 36 and the stop elements 71.

While specific embodiments of the invention have been shown and described in detail to illustrate the application of the principles of the invention, it will be understood that the invention may be embodied otherwise without departing from such principles.

What is claimed is:

1. A vehicle seat comprising:
a seat base with a base side panel;
a seat back with a seat back side panel;
a locking fixture pivotally connecting said seat back to said seat base, said locking fixture selectively locking said seat back to said seat base in a plurality of angular positions;
a return spring connected to said seat base and said seat back, said return spring biasing said seat back in an angular direction with respect to said seat base, said return spring being a coil spring and being arranged on an outside of said base side panel;
a handle arranged outward of said return spring and connected to said locking fixture, said handle forming an operator interface for an operator to operate said locking fixture and selectively lock and unlock said seat back to said seat base in said plurality of angular positions;
a stop element arranged on said outside of said base side panel, said stop element being connected to said handle and engaging with said locking fixture to limit rotation of said handle relative to said locking fixture, said stop element being arranged radially inside said return spring.

2. A vehicle seat in accordance with claim 1, wherein: said stop element has a larger diameter portion and smaller diameter portion, said larger diameter portion being arranged adjacent said locking fixture, said smaller diameter portion being arranged radially inside said return spring, said smaller diameter portion being further from said locking fixture than said larger diameter portion.

3. A vehicle seat in accordance with claim 2, wherein: said locking fixture defines a running area axially spaced from said return spring;

said stop element includes a lug arranged in said running area, said lug contacting an end of said running area to limit rotation of said handle relative to said locking fixture, said lug being arranged on said larger diameter portion of said stop element, said lug being arranged axially between said locking fixture and said return spring.

4. A vehicle seat in accordance with claim 2, wherein:
said larger diameter portion of said stop element is formed of a first material, said smaller diameter portion of said stop element is formed of a second material, said first material having a higher material strength than said second material.

5. A vehicle seat in accordance with claim 4, wherein:
said first material is a metal, and said second material is a plastic.

6. A vehicle seat in accordance with claim 4, wherein:
said second material is less dense than said first material.

7. A vehicle seat in accordance with claim 1, wherein:
said seat base has two of said base side panels on diametrically opposite sides of said seat base, said seat back has two of said seat back side panels on diametrically opposite sides of said seat back, said seat back side panels each having one end arranged inward of said base side panels.

8. A vehicle seat in accordance with claim 1, further comprising:
a cross shaft connecting said handle to said locking fixture, said cross shaft including a radial projection extending radially outward;
said stop element being arranged around said cross shaft between said locking fixture and said radial projection, said radial projection blocking axial movement of said cross shaft relative to said stop element;
a push nut arranged around said cross shaft between said handle and said radial projection, said radial projection blocking axial movement of said push nut relative to said stop element, said push nut including fingers, said fingers and said stop element being arranged to have said fingers rigidly connect said push nut to said stop element.

9. A vehicle seat in accordance with claim 8, wherein:
said fingers of said push nut extend radially outward;
said stop element includes an extension extending axially beyond said radial projection of said cross shaft, said fingers engage with said extension of said stop element.

10. A vehicle seat in accordance with claim 9, wherein:
said fingers interfere and bite into said extension of said stop element;
said cross shaft has a diameter, said radial projection extending beyond said diameter of said cross shaft;
said push nut defines an opening around said cross shaft, said opening being larger than said diameter of said cross shaft but smaller than a diameter of said radial projection.

11. A vehicle seat in accordance with claim 1, further comprising:
a cross shaft connecting said handle to said locking fixture, said cross shaft including a radial projection extending radially outward;
said stop element being arranged around said cross shaft between said locking fixture and said radial projection, said radial projection blocking axial movement of said cross shaft relative to said stop element;
a spring clip arranged around said cross shaft on a side of said radial projection diametrically opposite said stop element, said radial projection blocking axial movement of said spring clip relative to said stop element, said spring clip having fingers with prongs that pass through said stop element, said fingers latch into recesses of said stop element to fix said spring clip to said stop element.

12. A vehicle seat in accordance with claim 1, wherein:
said stop element is axially fixed to said locking fixture;
a cross shaft passes through said locking fixture and said stop element, said cross shaft including a radial projection extending radially outward and arranged between said stop element and said locking fixture, said radial projection having a size to not pass through said locking fixture and said stop element.

13. A vehicle seat in accordance with claim 1, further comprising:
a driver ring connected to said locking fixture, said stop element snapping into said driver ring to actually fix said stop element to said locking fixture.

14. A vehicle seat comprising:
a seat base with a base side panel;
a seat back with a seat back side panel;
a locking fixture pivotally connecting said seat back to said seat base, said locking fixture selectively locking said seat back to said seat base in a plurality of angular positions;
a return spring connected to said seat base and said seat back and biasing said seat back in an angular direction with respect to said seat base, said return spring being a coil spring and being arranged on an outside said base side panel;
a handle arranged outward of said return spring and connected to said locking fixture, said handle forming an operator interface for an operator to operate said locking fixture and selectively lock and unlock said seat back to said seat base in said plurality of angular positions;
a stop element arranged on said outside of said base side panel, said stop element being connected to said handle and engaging with said locking fixture to limit rotation of said handle relative to said locking fixture, said stop element being arranged radially inside said return spring, said stop element having a larger diameter portion and smaller diameter portion, said larger diameter portion being arranged adjacent said locking fixture, said smaller diameter portion being arranged radially inside said return spring, said larger diameter portion of said stop element being formed of a first material, said smaller diameter portion of said stop element being formed of a second material, said first material having a higher material strength than said second material.

* * * * *